Patented June 25, 1940

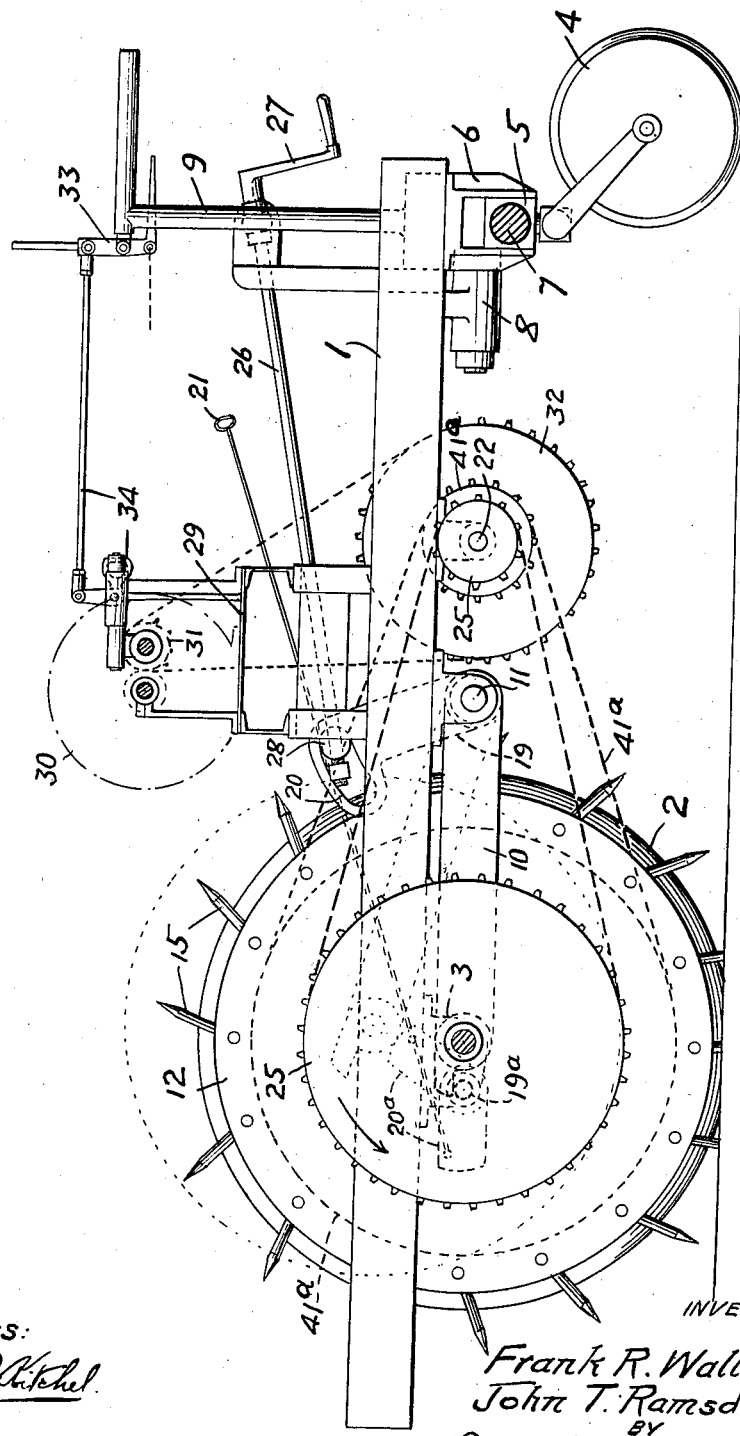

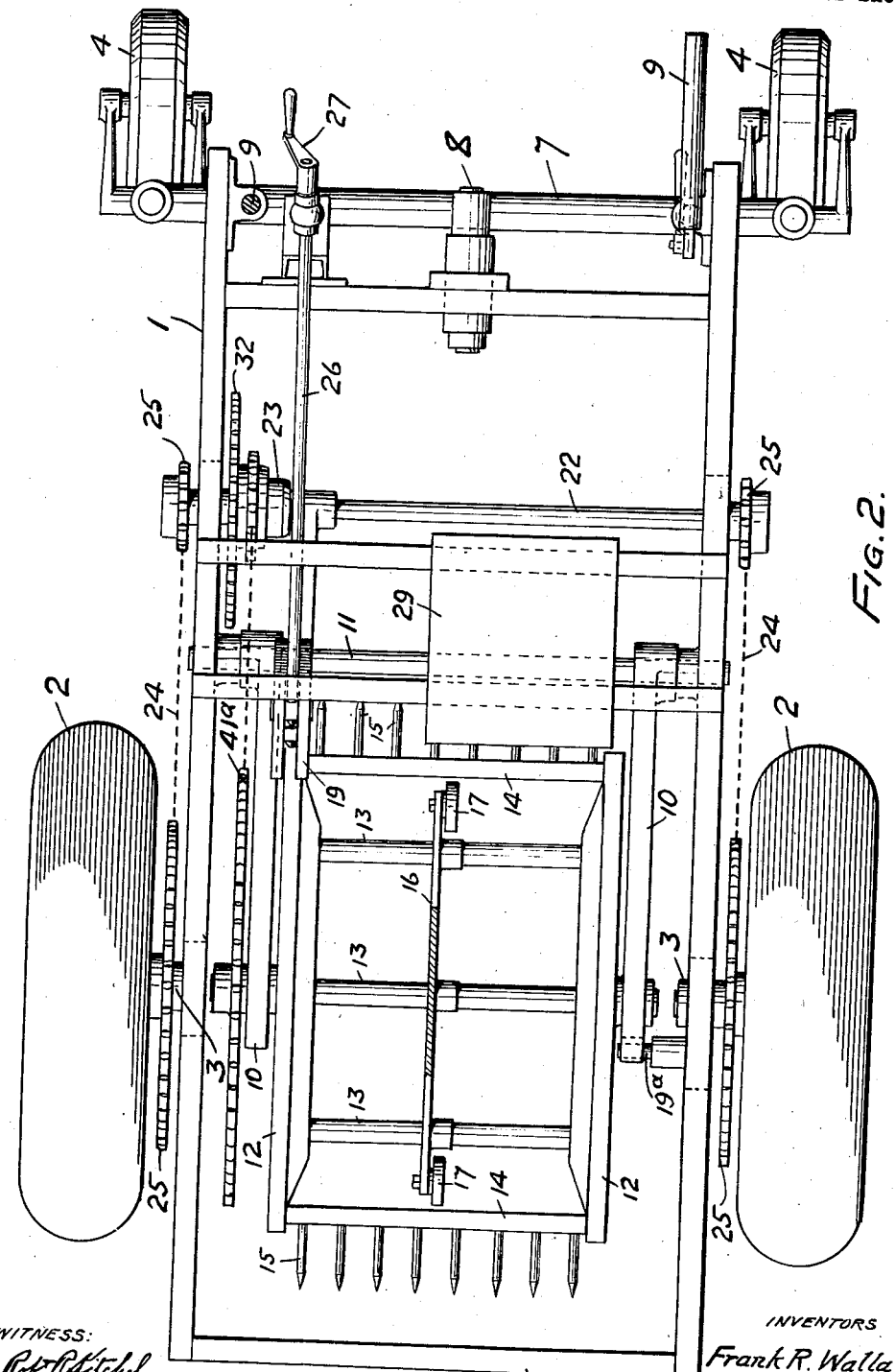

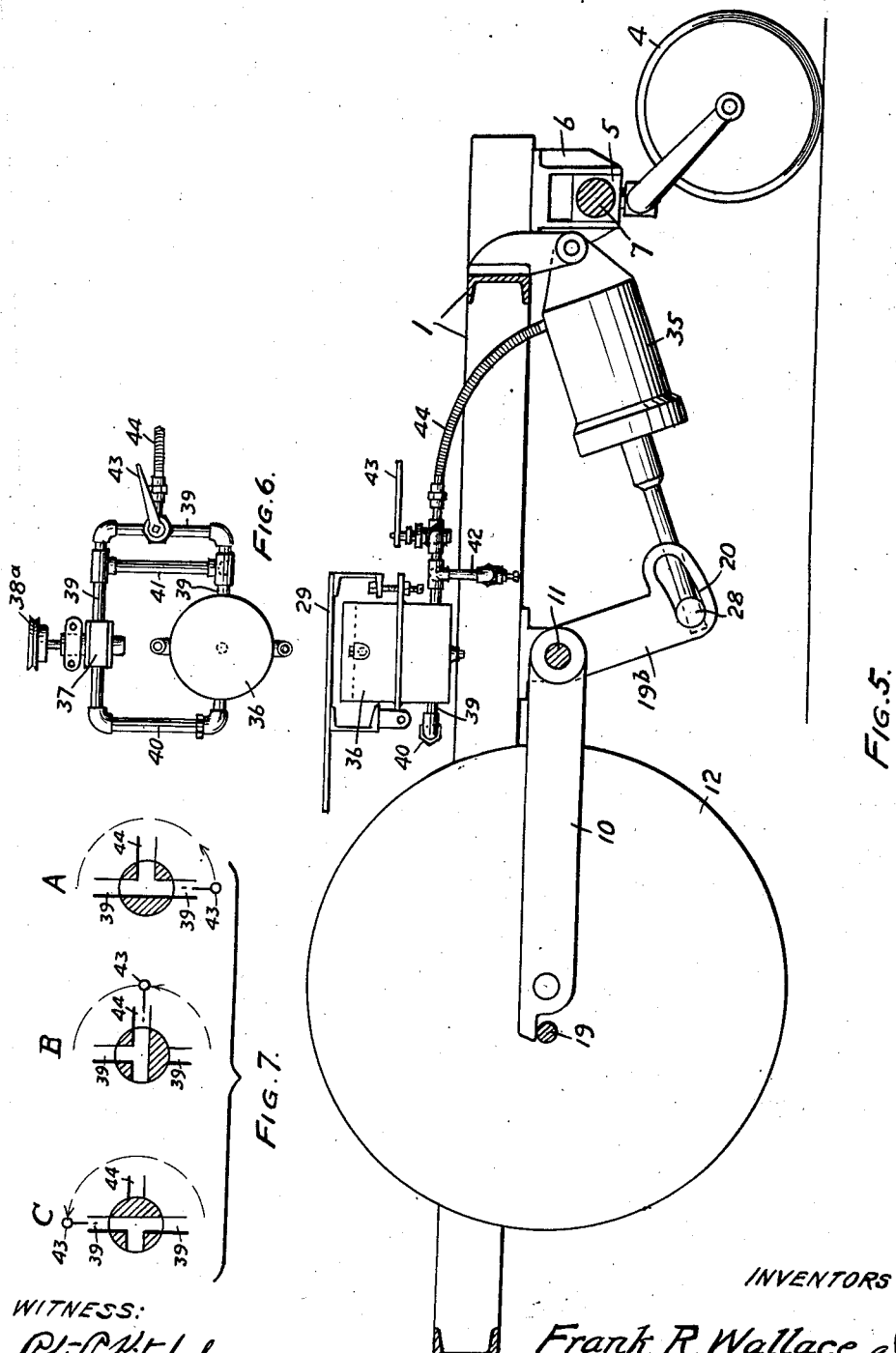

2,205,997

UNITED STATES PATENT OFFICE 2,205,997

DIBBLING MACHINE

Frank R. Wallace and John T. Ramsden, Philadelphia, Pa., assignors to The Tabor Manufacturing Company, Philadelphia, Pa., a corporation of Pennsylvania Application July 13, 1939, Serial No. 284,198

8 Claims. (Cl. 97—52)

The principal objects of the present invention are to provide for puncturing elongated vertical holes down through and below the roots of lawn grass so that a fertilizer can be fed down to and below the roots, to improve the construction and operation of the pin cage of which the weight forces rows of pins into the ground and which is free to rise and fall if an obstruction occurs in the pin path, to provide that the machine will operate on uneven ground, to so construct and arrange the parts of a machine that it may be made self-propelled or pulled by a tractor or the like, to correlate the carrying wheels and the axis of rotation of the pin cage in such a way that they are concentric and make the same number of revolutions per minute, and generally to improve the construction and operation of dibbling machines.

Other objects of the invention will appear from the following description at the end of which the invention will be claimed.

Generally stated, the invention consists in a carriage having ground wheels and a swinging frame, a pin cage having pins and revolubly mounted in the swinging frame and adapted to be positioned concentrically with the ground wheels and to be afforded freedom of rising and falling motion and to be lifted from the ground, and a countershaft having differential mechanism and mounted on the carriage and connected to the ground wheels and to the pin cage.

The invention also comprises the improvements to be presently described and finally claimed.

In the following description reference will be made to the accompanying drawings forming part hereof and in which, Figure 1 is an elevational view partly in section of a machine embodying features of the invention.

Figure 2 is a top or plan view with some of the pin bars and pins and some of the pin stop mechanism omitted for the sake of clearness.

Figure 5 is a side view with parts omitted illustrating modified means for lifting the pin cage.

Figure 6 is a top or plan view of a portion of the mechanism shown in Figure 5; and Figure 7 is a diagrammatic view illustrative of the valve by means of which the mechanism shown in Figs. 5 and 6 is operated.

Figure 4:
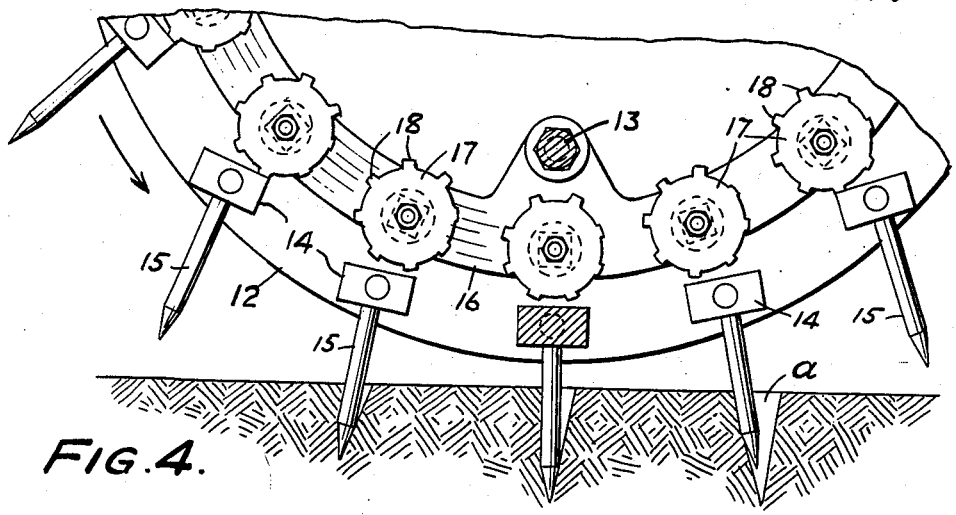
Figure 4 is a view drawn to an enlarged scale and partly in section and partly in elevation showing details of construction and illustrating the oblong holes made by the machine.

Referring to the drawings, 1 indicates a rectangular main frame. 2 are ground wheels shown as equipped with rubber tires and they are independently mounted on the outside of the frame as at 3. 4 indicates caster wheels which are swiveled to bearings 5 free to slide up and down in guides 6 connected to the frame. The bearings 5 are connected with the ends of a cross bar 7 which may oscillate to a limited degree in respect to the pivot 8 carried by the frame. 9 are handles by which the machine may be guided as it travels over the ground. 10 indicates a swinging frame fast on a jack shaft 11 journalled in the frame. In the swinging frame 10 is pivotally mounted the pin cage, shown to consist of spaced heads 12 connected by rods 13. Bars 14, rectangular in cross section, are pivotally mounted in the heads 12 and are provided with pins 15 immovably connected with them, so that each bar carries a group of pins 15, all of which enter and leave the ground at the same time. The cage also comprises a stop carrier 16, Figs. 2 and 4. On the stop carrier 16 are turnably and adjustably mounted stops 17 provided with projections 18 which progressively extend further from the center of the stop 17. The purpose of these stops is to properly position the row of pins 15 carried by the bars 14 for entering the ground and also after leaving the ground. This is illustrated in Figure 4, and in Figure 4 there is also shown one of the oblong holes $a$ made by a row of pins carried by the same bar 14. At this point it may be remarked that the ground wheels 2 and the pin cage travel at the same number of revolutions per minute. On the jack shaft 11 is fixed an arm 19 provided at its end with a slot 20. The means which will be hereinafter described by which the pin cage is lifted into inactive position or lowered into active position engage this slot in such a way that the frame 10 is allowed freedom of rising and falling motion when the pins 15 are operating on the ground. It is the weight of the pin carriage that drives the pins into the ground and if there is an obstruction, such as a stone, which prevents them from entering the ground the frame 10 and pin cage rise and none of the pins of a row enter the ground. The loss motion provided by the slot 20 permits of this movement of the frame 10 and pin cage. The carriage is provided with a fixed stop 19ª which limits the downward movement of the frame 10 and pin cage. When the pin cage and frame 10 are lifted up, by means which will be described, the pins clear the ground and a pivotal stop 20ᵃ is provided on the carriage and which may be turned up into position for holding the frame up in the position indicated in dotted lines in Figure 1. 21 is a hand rod for turning the stop 20ᵃ into position for holding the frame 10 up and into the position for permitting the frame 10 to rest on the stop 19ᵃ. 22 is a shaft provided with a differential mechanism 23 and this shaft is geared to the ground wheels 2 by sprocket chains 24 and sprocket 25. 26 is a screw shaft mounted in the frame and it can be turned by means of the handle 27. The screw shaft 26 is connected with a nut 28 mounted in the slot 20 so that by turning the handle 27 the frame 10 and pin cage can be lifted up into inactive position and lowered into active position with the nut 28 at the right-hand end of the slot 20 as shown in Figure 1. So far as has been described the dibbling machine may be propelled over the ground by a tractor or the like attached to the left hand end in Figure 1 and the operator may guide it by means of the handles 9 and may put the pins into and out of action by means of the handle 27. In this case the ground wheels 2 serve to rotate the pin carriage by way of the differential shaft 22 and the sprocket chain and wheel gearing 41ᵃ.

Figure 3:
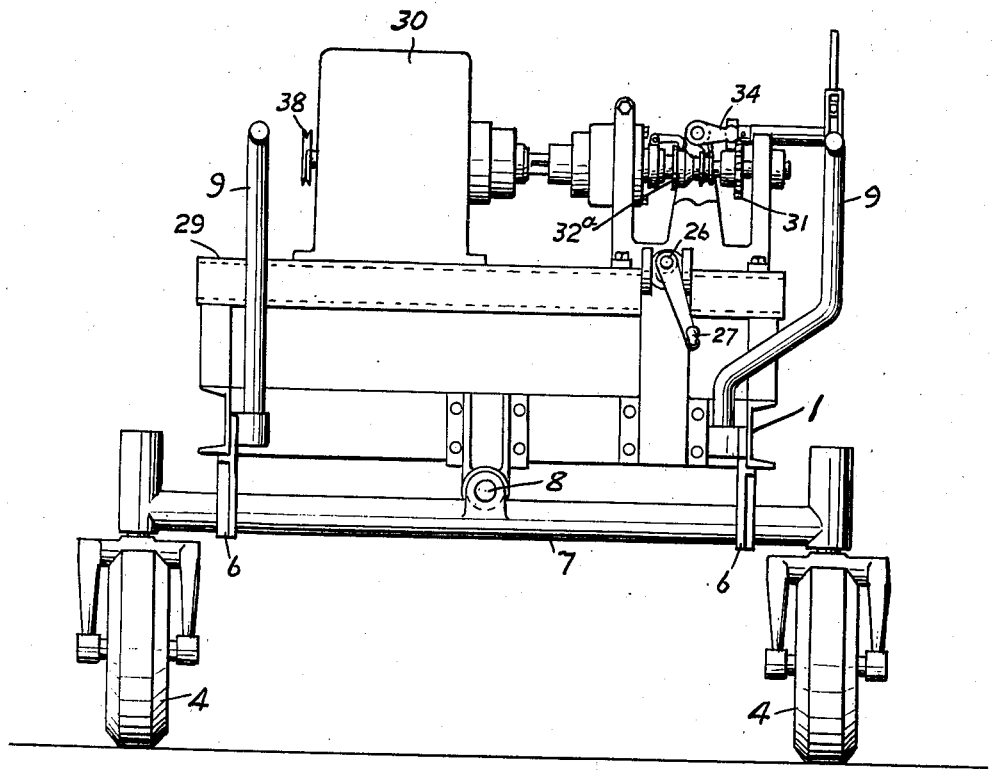
Figure 3 is a view of the front of the machine with the rear portion thereof omitted.

The machine is adapted to be self-propelled and a description will now be given of means to that end. On a suitable platform 29, Fig. 3, mounted on the frame 1 is located a gasoline motor 30. The gasoline motor 30 operates a sprocket wheel 31 connected by a sprocket chain with a sprocket wheel 32 on the counter or differential shaft 22, Fig. 2. Interposed between the sprocket wheel 31 and the motor 30 there is a starting, stopping and reversing mechanism 32ᵃ. This mechanism is operated by a pivotal hand lever 33 attached to one of the handles 9, Figs. 1 and 3. The hand lever 33 operates the starting, stopping and reversing mechanism 32ᵃ through the intervention of linkage 34. Thus the operator by means of the hand lever 33, Fig. 1, may start, stop and reverse the direction of travel of the machine.

The function of the oscillating bar 7 is to equalize the load on the caster wheels 4 and it permits of a limited side motion of the pin cage while the machine is moving over irregular surfaces, it also prevents the machine from overturning on a side hill because the two ground wheels 2 and the fulcrum pin 8 form a three point bearing for the frame 1.

In case the machine is provided with a motor its power may be utilized for actuating the frame 10 by means of the arm 19 with its slot 20 as a modification of the invention.

Referring to Figure 5, a description will be given of that modification. The arm 19ᵇ extends downward from the jack shaft 11 and it is connected with the piston of the cylinder 35 connected to the frame 1. The piston and cylinder 35 are oil actuated and for this purpose there is provided an oil reservoir 36 and a rotary oil pump 37. The pump 37 is run constantly as long as the motor 30 is running and it is driven by a V-belt running on a pulley 38 on the motor shaft, Fig. 3, and a pulley 38ᵃ on the pump shaft. The outlet side of the pump is connected with the reservoir by a connection 39 and the inlet side of the pump is connected to the reservoir by a connection 40. There is a by-pass connection 41 across the connection 39 and it is provided with a relief valve 42, Fig. 5. 43 is a hand valve. The cylinder 35 is connected by means of a flexible connection 44 with the outlet of the valve 43.

Referring to Figure 7, A indicates the position of the valve when the oil circulates freely from the outlet of the pump back to the inlet of the pump. There is, therefore, no pressure in the cylinder 35 and the frame 10 and parts which it carries are free to rise and fall, for example, if a pin strikes a stone or obstruction on the ground. At B is shown the position of the valve for lifting the frame by the introduction of oil into the cylinder 35. At C is shown the position of the valve for locking the frame in elevated position by preventing the escape of oil from the cylinder 35.

It will be obvious to those skilled in the art to which the invention relates that modifications may be made in details of construction and arrangement and in matters of mere form without departing from the spirit of the invention which is not limited in respect to such matters, or otherwise than the prior art and the appended claims may require.

We claim:

1. In a dibbling machine the combination of a carriage having ground wheels and a swinging frame, a pin cage having pins and revolvable in the swinging frame and adapted to be positioned concentrically with the ground wheels and to be lifted clear of the ground, means for rotating the pin cage, and mechanism mounted on the carriage and constructed to lift the swinging frame and including a loss motion device whereby the frame is free to rise when a pin encounters an obstruction.

2. In a dibbling machine having a wheeled carriage and a swinging frame, a pin cage carried by the frame, means for rotating the pin cage, said pin cage comprising spaced heads, rectangular bars pivoted to said heads and each provided with a plurality of pins affixed thereto, a stop carrier mounted in the cage, and adjustable turnable stops carried by the carrier and provided with projections arranged at different distances from the center and constructed to engage the pin bars to adjustably limit the turning movement thereof.

3. A dibbling machine having a carriage provided with ground wheels and a freely movable swinging frame, a pin cage having pins and rotatably mounted in the frame and adapted to be positioned concentrically with the axes of the ground wheels and rise and fall freely in respect to that position, means for rotating the cage, the weight of the cage and swinging frame being the sole means for driving the pins into the ground, and an obstruction in the path of the pins operating to temporarily lift the cage and turn the frame.

4. In a dibbling machine a carriage having ground wheels and caster wheels, a pin cage having pins and positionable concentrically with the ground wheels, a bar centrally pivoted to the carriage for tilting movement about a horizontal pivot and to which the caster wheels are swiveled, to provide the effect of a three point suspension for the pin cage and to permit some lateral motion of the same.

5. In a dibbling machine the combination of a wheeled carriage having a jack shaft, a frame pivoted to said shaft, a pin cage revolvably mounted in the frame, means for turning the cage, an arm on said shaft, provisions for turning the arm to lift the frame and cage, and a slot and pin connection interposed between said provisions and the arm to afford the cage freedom of rising and falling movement.

6. In a dibbling machine the combination of a wheeled carriage having a jack shaft, a frame pivoted to said shaft, a pin cage revolvably mounted in the frame, means for turning the cage, an arm on said shaft, provisions for turning the arm to lift the frame and cage, a slot and pin connection interposed between said provisions and the arm to afford the cage freedom of rising and falling movement, a stop on the carriage for limiting the downward movement of the frame, and a second manually operated pivotal stop on the carriage adapted to hold the frame in elevated position with the pins of the cage clear of the ground.

7. A dibbling machine having a carriage provided with ground wheels and a swinging frame, a pin cage having pins and revolvably mounted in the swinging frame and adapted to be positioned concentrically with the ground wheels and to be lifted from the ground, a counter-shaft having differential mechanism and mounted in the carriage and connected to the ground wheels and to the pin cage, a motor mounted on the carriage and having stop, start and reverse mechanism connected with the counter-shaft, a piston and cylinder having loss motion connection with the swinging frame and adapted to raise and lower it, and an oil pump driven by the motor and its connections including a hand valve for actuating the piston and cylinder.

8. In a dibbling machine, a main frame, ground wheels independently mounted on the outside of the main frame for rotation, a swinging frame mounted inside of the main frame, a pin cage turnably mounted in the swinging frame and adapted to be positioned concentrically with the ground wheels, and a counter-shaft having a differential mechanism and connected with the ground wheels and with the pin cage.

FRANK R. WALLACE.
JOHN T. RAMSDEN.